Patented Apr. 7, 1925.

1,532,800

UNITED STATES PATENT OFFICE.

HERMANN EMDE, OF BERLIN-LANKWITZ, GERMANY, ASSIGNOR TO CHEMISCHE FABRIK AUF ACTIEN (VORM. E. SCHERING), OF BERLIN, GERMANY.

PROCESS FOR MANUFACTURING HYDROQUINONE.

No Drawing.   Application filed August 9, 1921.   Serial No. 490,889.

(GRANTED UNDER THE PROVISIONS OF THE ACT OF MARCH 3, 1921, 41 STAT. L., 1313.)

*To all whom it may concern:*

Be it known that I, HERMANN EMDE, a citizen of Germany, residing at Berlin-Lankwitz, Germany, have invented a new and useful Improvement in Processes for Manufacturing Hydroquinone (for which I have filed application in Germany, July 24, 1919, Patent No. 352,982), of which the following is a specification.

The reduction of quinone to hydroquinone by means of the methods used hitherto only takes a tolerable course if the process is executed at room temperature or in such a dilution that no quinhydrone separates. But even in this case the output is not satisfactory. Quinhydrone which is not dissolved in water but only suspended proves to be very resistent against the substances hitherto used for reduction so that they have to be applied in great excess and for a long time.

I now have found out that quinhydrone can be reduced to hydroquinone very quickly and with an excellent output if heated with a watery mixture of a ferrous salt and an alkaline earth carbonate.

*Example.*

To a boiling mixture of 27.8 parts of crystallized ferrous sulphate, 19.7 parts of precipitated barium carbonate and 100 parts of water 11 parts of quinhydrone are added little by little. The mixture is kept boiling until no more carbon dioxide is given off. The filtering off of the precipitated sulphate and ferric hydroxide is done while the mixture is hot and the filtrate is evaporated to dryness in a vacuum.

This process can be taken advantage of in the reduction of quinone to hydroquinone by reducing the quinone to about quinhydrone in the usual way and by heating the reaction mixture containing quinhydrone with ferrous salt and alkaline earth carbonate.

*Example.*

The sulphuric quinone solution obtained by the oxidation of 9.3 parts of aniline is mixed with 2.8 parts of iron powder or with the quantity of iron powder necessary for neutralizing the free acid and stirred until the iron is essentially dissolved, this mixture being added to a boiling mixture of 4 parts of sulphate of iron, 10 parts of purified calcium carbonate and 50 parts of water. This mixture is kept boiling until the evolution of carbon dioxide has ceased and afterwards filtered to separate the precipitated sulphate and ferric hydroxide from the pure water solution of hydroquinone.

I claim as my invention:

1. The process of making hydroquinone which consists in heating quinhydrone with a watery mixture of a ferrous salt and an alkaline earth carbonate.

2. The process of making hydroquinone which consists in heating quinhydrone with a watery mixture of ferrous sulphate and calcium carbonate.

3. The process of making hydroquinone which consists in adding quinhydrone to a boiling mixture of a ferrous salt, calcium carbonate and water, heating the mixture further until the development of carbonic acid has ceased and isolating the formed hydroquinone.

4. The process of making hydroquinone which consists of heating the reaction mixture resulting from the reduction of quinone to quinhydrone with a watery mixture of a ferrous salt and an alkaline earth carbonate.

5. The process of making hydroquinone which consists of adding the reaction mixture resulting from the reduction of quinone to quinhydrone to a boiling mixture of ferrous sulphate and calcium carbonate, heating the mixture further until the development of carbonic acid has ceased, and isolating the formed hydroquinone.

In testimony whereof I have hereunto set my signature in the presence of two subscribing witnesses.

HERMANN EMDE.

Witnesses:
J. HALLER,
C. W. DONNALLY.